United States Patent [19]

Matsushita

[11] 3,971,261

[45] July 27, 1976

[54] SLIDE DRIVING DEVICE FOR USE IN METAL WORKING PRESS

[75] Inventor: Keiji Matsushita, Komatsu, Japan

[73] Assignee: Kabushiki Kaisha Komatsu Seisakusho, Tokyo, Japan

[22] Filed: Dec. 11, 1974

[21] Appl. No.: 531,702

[30] Foreign Application Priority Data

Dec. 11, 1973 Japan .............................. 48-137382

[52] U.S. Cl. .............................. 74/52

[51] Int. Cl.[2] .............................. F16H 37/12

[58] Field of Search .............................. 74/52, 802

[56] References Cited

UNITED STATES PATENTS

| | | | |
|---|---|---|---|
| 3,468,173 | 9/1969 | Fracke | 74/52 |
| 3,529,485 | 9/1970 | Köfferlein | 74/52 |

*Primary Examiner*—Benjamin W. Wyche
*Assistant Examiner*—Wesley S. Ratliff, Jr.
*Attorney, Agent, or Firm*—Armstrong, Nikaido & Wegner

[57] ABSTRACT

A slide driving device for use in a metal working press having an eccentric sheave capable of effecting an eccentric rotation and an oscillating link member adapted to oscillate in response to the eccentric rotation of the eccentric sheave. A slide of the metal working press is connected with the oscillating link member through a connecting rod. The eccentric sheave is adapted to be eccentrically rotated at uneven angular velocities so that the downwardly moving speed of the slide is reduced relative to the operating speed of the press which is supplied with power from the driving power source.

1 Claim, 3 Drawing Figures

SLIDE DRIVING DEVICE FOR USE IN METAL WORKING PRESS

BACKGROUND OF THE INVENTION

1. Field of the Invention

This invention relates to an improvement in a slide driving device for use in a metal working press.

2. Description of the Prior Art

Generally, in a metal working press, if the press operating speed is increased, that is, if the time required for one stroke of a slide for use in the metal working press is reduced, the productivity of the press may be improved. However, if the downward moving speed of the slide in the substantial press working range thereof is increased in excess of a predetermined value favorable to a material to be subjected to the press working, it has a bad effect upon the resulting articles.

In a conventional slide driving device for use in a metal working press, the downwardly moving speed of the slide in the substantial press working range thereof has not been able to be reduced relative to the press operating speed supplied from the power source thereof because an eccentric sheave adapted therein to exert upward and downward movements on the slide is rotated at a constant angular velocity. Therefore, it has not been possible to increase the operating speed of such a conventional device over a predetermined value, and thus a significant improvement in the productivity of the metal working press has not been expected.

SUMMARY OF THE INVENTION

The present invention aims to eliminate the abovementioned disadvantage in the prior art slide driving device, and has for its object to provide a slide driving device for use in a metal working press wherein the downwardly moving speed of the slide driven by the device, particularly that in the substantial press working range thereof, can be significantly reduced relative to the operating speed of the press, that is, if the downwardly moving speed of the slide within the substantial press working range thereof is kept at the same value as that of the slide driven by the conventional slide driving device, the operating speed of the press can be remarkably increased so as to improve the productivity of the press.

According to one aspect of the present invention, there is provided a slide driving device for use in a metal working press including a main shaft rotatably suspended on the device frame, a rotary member fixedly mounted on the main shaft and adapted to be rotated at a constant angular velocity by the driving power source, an eccentric sheave mounted on the main shaft and adapted to be eccentrically rotated around the main shaft and an oscillating link member mounted on the eccentric sheave through which eccentric rotation of the eccentric sheave is effected. The oscillating link member is adapted to be oscillated by the eccentric rotation of the eccentric sheave. A connecting rod is pivotally connected between the oscillating link member and the slide, and an eccentric arm shaft is connected between the eccentric sheave and the rotary member at their respective offset positions so that rotation of the rotary member is transmitted to the eccentric sheave. The improvement comprises a fixed gear serving as a bushing fixedly secured to the device frame at one end of the main shaft and a planetary or epicyclic gear fixedly secured to one end of the eccentric arm shaft and adapted to mesh with the fixed gear. A pin shaft is eccentrically and rigidly secured through an arm member to the other end of the eccentric arm shaft so that the pin shaft, arm member and eccentric arm shaft form an integral crank shaft. A slider is rotatably mounted on the pin shaft and a long slot is formed at a dish part of the rotary member in the radial direction thereof within which the slider is slidably housed. Upon rotation of the rotary member the eccentric arm shaft is rotated around the main shaft while turning round on its own axis by the co-operative action of the fixed and planetary gears, with the result that, the slider is slidingly moved within the long slot of the rotary member in the radial direction thereof, whereby the eccentric sheave is eccentrically rotated around the main shaft at different angular velocities.

BRIEF DESCRIPTION OF THE DRAWINGS

The above and other objects, features and advantages of the present invention will become apparent from the following description taken in conjunction with accompanying drawings, in which.

DETAILED DESCRIPTION OF THE PREFERRED EMBODIMENT

Figure 1:
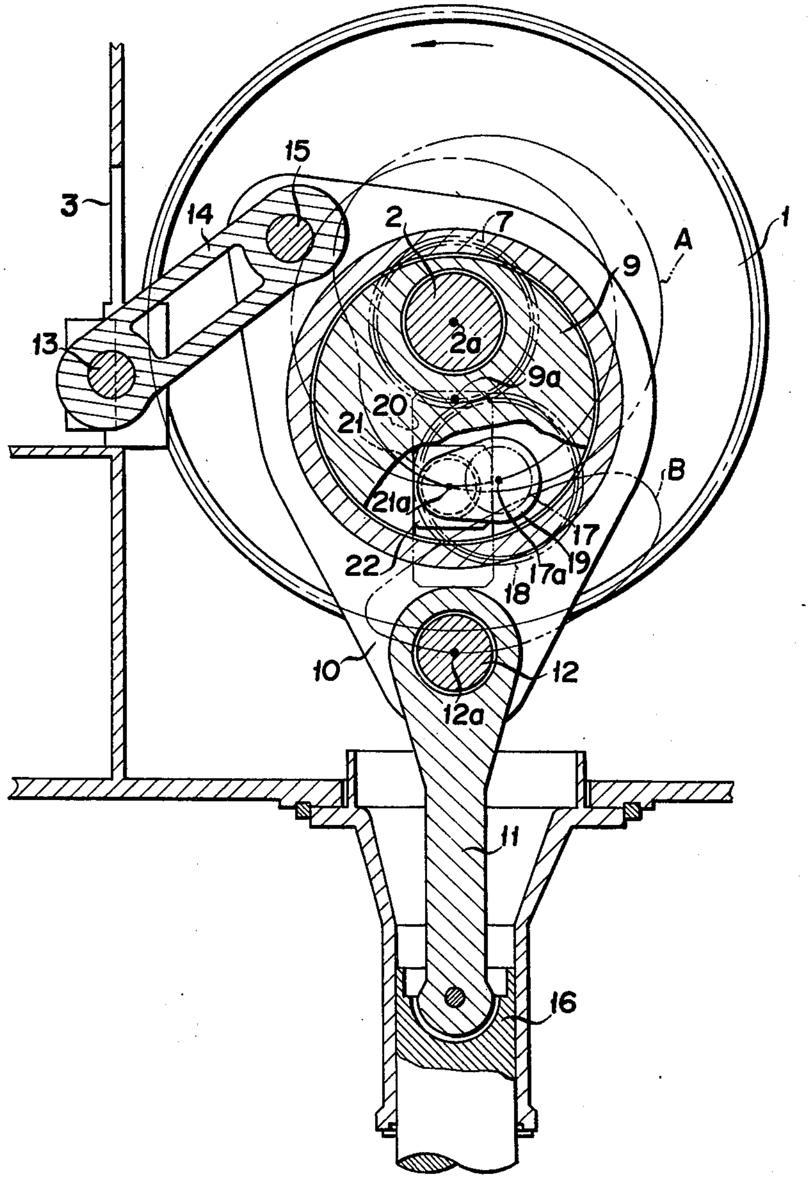
FIG. 1 is a partly cut away vertical section view showing a slide driving device for use in a metal working press embodied by the present invention.
Figure 2:
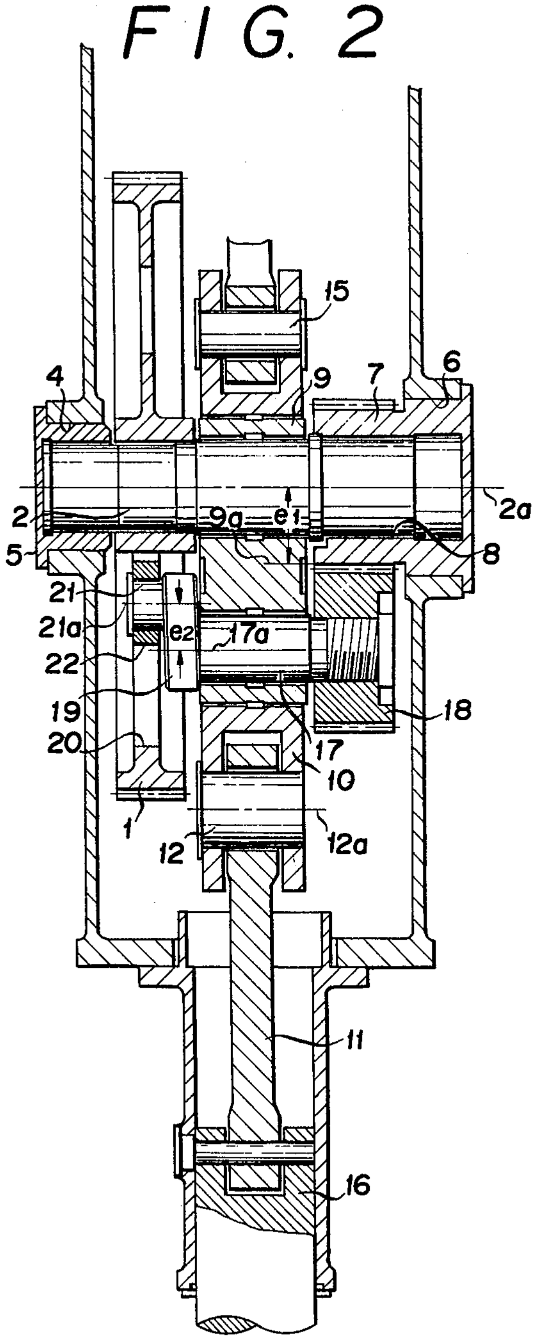
FIG. 2 is another vertical sectional view of the device taken along irregular section lines in FIG. 1.

One preferred embodiment of the present invention will now be described below in detail with reference to the accompanying drawings.

Reference numeral 1 represents a main gear or rotary member adapted to be rotated at a constant angular velocity by engaging a drive gear (not shown) driven by a power source (not shown). The main gear 1 is fixedly mounted to a main shaft 2. One end of the main shaft 2 is rotatably carried by a bushing 5 which is fitted in and fixedly secured to a hole 4 formed in the device frame 3. The other end of the main shaft 2 is fitted in and rotatably carried by a hole 8 formed within a fixed gear 7 which serves as a bushing for the main shaft 2 and is fitted in and fixedly secured to a hole 6 formed in the device frame 3.

Reference numeral 9 denotes an eccentric sheave mounted on the main shaft 2 so as to be eccentrically rotated around the shaft 2. The center axis 9*a* of the eccentric sheave 9 is separated from the axis 2*a* of the main shaft 2, which serves the eccentric shaft of the sheave 9, by a distance of $e_1$. The eccentric sheave 9 is rotatably fitted in an oscillating link member 10. One end of the oscillating link member 10 is pivotally connected through a pin shaft 12 to a connecting rod 11 which is pivotally connected through a plunger 16 to a slide (not shown). The other end of the oscillating link member 10 is pivotally connected by a pin shaft 15 to a link 14 which is pivotally connected to the frame 3 by a pin shaft 13.

Further, the eccentric arm shaft 17 is rotatably fitted in the eccentric sheave 9 at a position opposite to the main shaft 2 relative to the center axis 9*a* of the eccentric sheave. Fixedly secured to one end of the eccentric arm shaft 17 is a planetary or epicyclic gear 18 which engages with the fixed gear 7 and has the same number of gear teeth as gear 7. Fixedly secured to the other end of the eccentric arm shaft 17 is one end of an arm member 19. The other end of the arm member 19 is fixedly secured to a pin shaft 21. Thus, the eccentric arm shaft 17, arm member 19 and pin shaft 19 form an integral crank shaft. The axis 21*a* of the pin shaft 21 is separated from the axis 17*a* of the eccentric arm shaft 17 by a distance of $e_2$. Mounted on the pin shaft 21 is a slider 22 which is slidably moved within a long slot 20 formed at a disk part of the main gear 1 in a radial direction thereof.

In operation when the main gear or the rotary member 1 is rotated at a constant angular velocity, the eccentric arm shaft 17 is rotated around the main shaft 2 while being rotated about its own axis 17*a* by the epicyclic motion of the planetary gear 18 in co-operation with the fixed gear 17 so as to exert a sliding movement in the radial direction of the main gear 1 within the long slot 20 on the slider 22 and also to exert eccentric rotation about the main shaft 2 at different angular velocities on the eccentric sheave 9.

Figure 3:
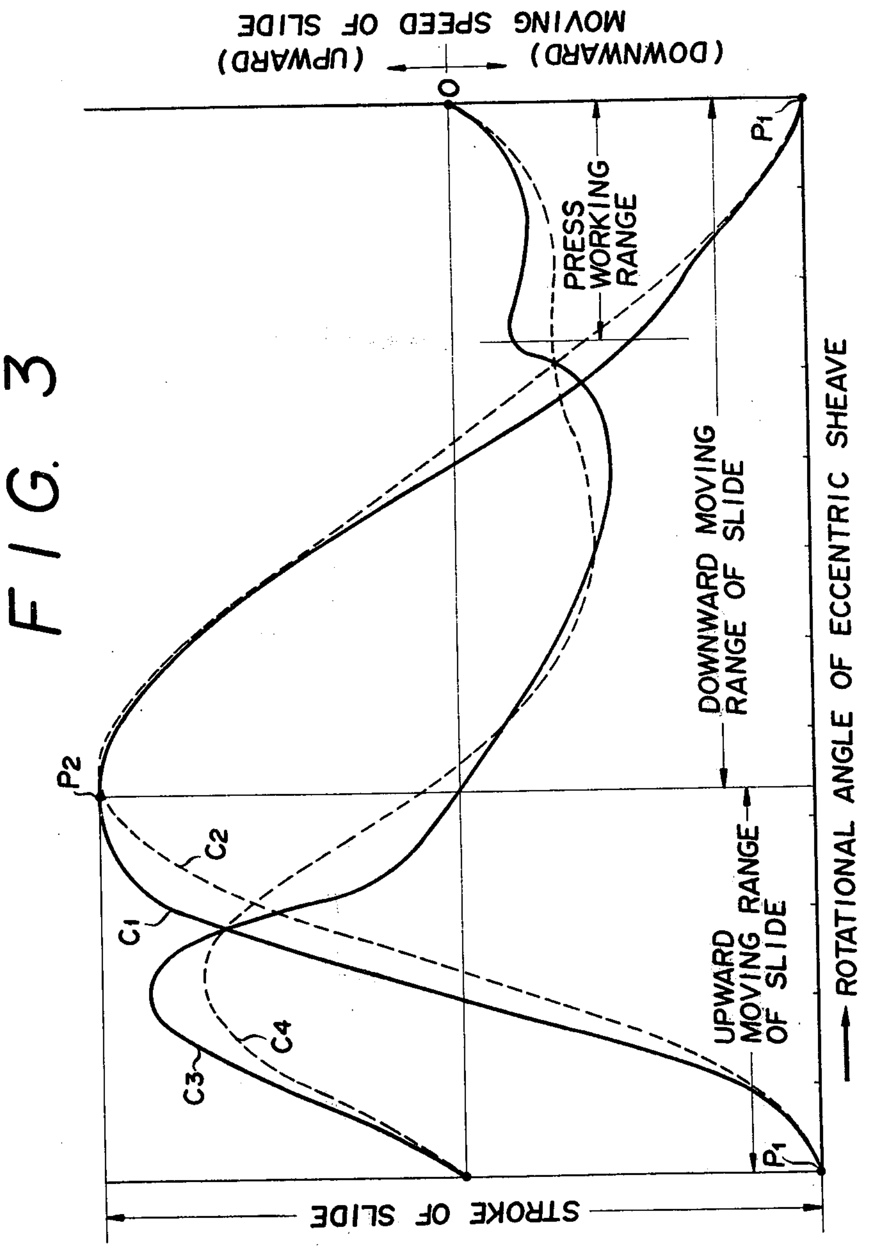
FIG. 3 is a stroke and velocity diagram of a slide of a metal working press relative to a rotational angle of an eccentric sheave of the device in which solid lines show these diagrams obtained by the device of the present invention and dotted lines show those obtained by a conventional device.

Therefore, the axis 21*a* of the pin shaft 21 is moved to generate a locus A as shown in FIG. 1. At the same time, since the oscillating link member 10 is oscillated by the rotation of the eccentric sheave 9, the axis 12*a* of the pin shaft 12 is moved to generate a locus B as shown in FIG. 1. Following to the oscillating movement of the oscillating link member 10, the slide is moved upwards and downwards along the stroke and velocity diagrams as shown in FIG. 3 in which solid line curves $C_1$ and $C_3$ represent stroke and velocity diagrams of the slide driven by the slide driving device of the present invention, respectively, while dotted line curves $C_2$ and $C_4$ show, respectively, those of a slide driven by a conventional slide driving device having an eccentric sheave adapted to be rotated at a constant angular velocities. Points $P_1$ and $P_2$ located on the curve $C_1$ represent the bottom and top dead centers of the slide stroke.

In comparison of the two curves $C_2$ and $C_4$, it will be clearly understood that the downwardly moving speed of the slide driven by the slide driving device of the present invention within the substantial press working range thereof can be reduced by about 30 % from that of the slide driven by the conventional device. This means that, if the downwardly moving speed of the slide driven by the device of the present invention is kept at the same value as that of the slide driven by the conventional device, the operating speed of the metal working press can be increased at about 30 % as compared with that of the press in which a conventional slide driving device is used.

Thus, according to the present invention, the productivity of the metal working press can be remarkably improved.

What is claimed is:

1. In a slide driving device for use in a metal working press including a main shaft rotatably suspended on the device frame, a rotary member fixedly mounted on the main shaft and adapted to be rotated at a constant angular velocity by a driving power source, an eccentric sheave mounted on the main shaft and adapted to be eccentrically rotated about the main shaft, an oscillating link member oscillatingly mounted on the eccentric sheave to eccentrically rotate the eccentric sheave, the oscillating link member being adapted to oscillate in response to the eccentric rotation of the eccentric sheave, a connecting rod pivotally connected between the oscillating link member and the slide, and an eccentric arm shaft connected between the eccentric sheave and the rotary member at their respective offset positions so that rotation of the rotary member is transmitted to the eccentric sheave, the improvement comprising:

a fixed gear serving as a bushing fixedly secured to the device frame at one end of said main shaft;

a planetary or epicyclic gear fixedly secured to one end of said eccentric arm shaft and adapted to mesh with said fixed gear;

a pin shaft eccentrically and rigidly secured through an arm member to the other end of said eccentric arm shaft wherein said eccentric arm shaft, arm member and pin shaft form an integral crank shaft;

a slider rotatably mounted on said pin shaft; and a long slot formed at a disk part of said rotary member in the radial direction thereof within which said slider is slidably housed, wherein when said rotary member is rotated said eccentric arm shaft is rotated about said main shaft while rotating on its own axis by the co-operative action of said fixed and planetary gears, whereby said slider is slidingly moved within said long slot of said rotary member in the radial direction thereof, and said eccentric sheave is eccentrically rotated about said main shaft at different angular velocities.

* * * * *